United States Patent Office 2,954,694
Patented Oct. 4, 1960

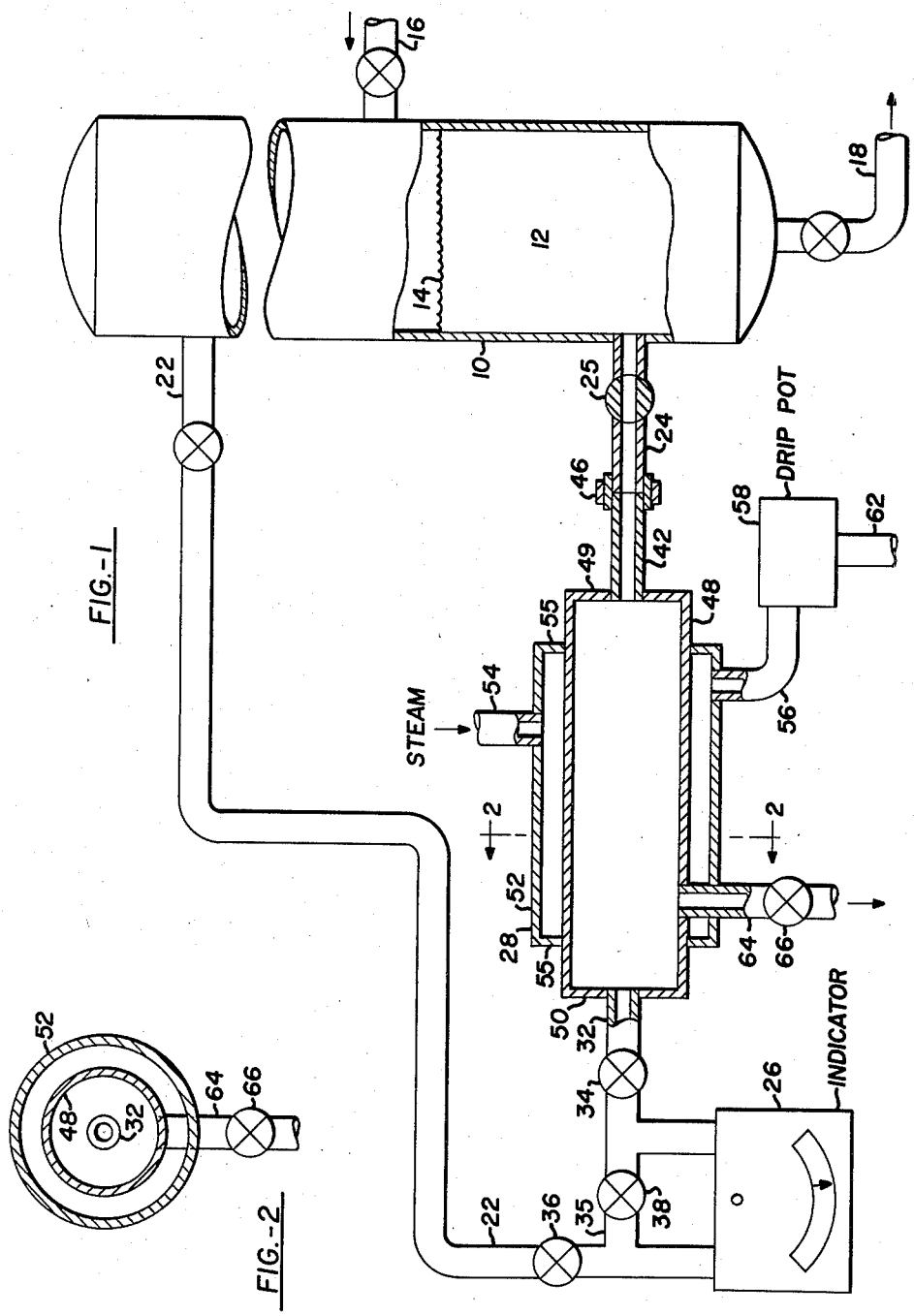

2,954,694

BLOWBACK SYSTEM

Louis Neill Fagan, Baton Rouge, La., assignor to Esso Research and Engineering Company, a corporation of Delaware Filed Oct. 18, 1955, Ser. No. 541,282

1 Claim. (Cl. 73—302)

This invention relates to blowback systems for use in keeping measured liquids out of the meter lines and to prevent plugging of meter leads. More particularly the present invention relates to a simple and effective self-blowback pot for use in pressure sensing instruments.

In cases where it was desired to measure the volume or liquid level of low boiling point liquids in a tank, vessel or other container, it has been necessary to use a complicated blowback system along with the measuring equipment whereby liquid material being measured is vaporized and bled through orifices into the vessel or line involved. The purpose of a blowback system is to give more accurate readings on the measuring instruments. A blowback failure always causes upset conditions.

However, previously used blowback systems for low boiling point liquids such as liquefied ethylene or ammonia, etc. are expensive as they involve a control system and means for preparing the gas for use as a blowback medium because in these systems it is necessary to use the gas corresponding to the liquefied material. In addition, the previously used blowback systems require hundreds of feet of pipe because each unit including a vessel or tank and associated meter has to have its own run of piping to bring to it the prepared blowback gas. Also, the gas when blown into the vessel or tank becomes an additional load on the operating unit. The known blowback systems require orifices for conducting gas to the top and bottom of the vessel or tank. With the present invention the orifices are eliminated, and orifices, being tiny holes, have been the greatest source of trouble in these systems. Cold congealed oil was one of the main causes of orifice plugging.

According to the present invention a simple, trouble free and cheap blowback system is provided which is more efficient than previously known and used blowback systems and which is light and compact. With this invention the efficiency of the measuring instruments is increased and the troubles and problems of the previously used blowback system such as orifice plugging, liquefaction of gases in meter lines etc. have been eliminated.

Where, in the previously known and used systems, a control system was necessary and lines running to a plurality of tanks or vessels were necessary, with the present invention, a simple self-blowback pot or vaporizer pot is used for each tank or vessel. The present invention is especially adapted for use in measuring liquid levels of liquefied gases in tanks or vessels or the like, the liquid comprising liquefied hydrocarbon gases such as ethylene, propylene, butylenes, ethane, propane, butane, etc. and other liquefied gases such as ammonia, carbon dioxide, sulfur dioxide, etc. The gases are maintained at low temperature and low pressure when using ethylene, ammonia and similar gases.

More specifically a vaporizer or blowback pot is connected with the bottom or lower portion of a tank or vessel containing liquefied normally gaseous material and with an indicator responsive to pressure. The indicator is also connected to the upper portion of the tank or vessel. A very small amount of liquefied gas is introduced into the vaporizer pot which is heated by steam. The liquefied gas on being heated, gasifies or flashes and this creates a pressure within the pot which forces the gas to go back into the tank or vessel and this is the blowback action. The action is continuous.

In the drawings:

Fig. 1 represents one form of apparatus adapted for use for measuring liquefied gas in a tank; and Fig. 2 represents a vertical cross sectional view taken on line 2—2 of Fig. 1.

Referring now to the drawing, the reference character 10 designates a tank or vessel adapted to contain liquefied gases. The tank is shown as containing liquefied gaseous material 12 having a level indicated at 14. An inlet 16 is provided for introducing liquefied gas into the tank 10 and a bottom valved outlet 18 is provided for withdrawing liquefied gas as desired. One of the materials to be contained in the vessel or tank 10 is liquefied ethylene which is maintained under a low pressure and at a temperature between about −110° F. to −150° F. The ethylene is not pure ethylene and contains some impurities as ethane, etc. The pressure is about 3 lbs. per square inch gauge. The specific gravity of the liquefied ethylene is between about 0.60 and 0.66. The ethylene is used as a refrigerant or as a cooling medium and one specific use is for chilling isobutylene, methyl chloride, and catalyst from about −20° F. to −140° F. before they go into the reactors, and maintaining the latter temperature in the reactor at all times while the reactors convert those components to the desired product. However, the present invention is not to be restricted to this use or to ethylene as the invention has a wider application and may be used with liquefied gaseous materials having a boiling point below (colder than) 0° F. preferably below −20° F.

Communicating with the upper portion of the tank or vessel 10 is valved line 22 and communicating with the bottom or lower portion of the tank 10 below the level of liquid 14 is line 24 provided with valve 25. The line 22 communicates with one side of the pressure responsive indicator 26 which is graduated to indicate the level of liquid in the tank 10. Connected into line 24 is a self-blowback pot or vaporizer pot generally indicated as 28 and which will be described in greater detail hereinafter. Extending beyond the vaporizer pot 28 is line 32 provided with valve 34 and communicating with the other side of the pressure responsive indicator 26. Line 35 is provided for providing communication between lines 22 and 32. Line 22 is provided with valve 36 arranged above the line 35, and line 35 is provided with valve 38. When it is desired to equalize the pressures on the pressure responsive indicator 26, valves 34, 36 and 38 are opened and after equilibrium is established valve 38 is closed. Thereafter, pressure is created in the line 32 as will be hereinafter described and an indication given on the pressure responsive 26 to indicate the level 14 in the tank 10.

Returning now to the bottom or lower line 24 communicating with the bottom or lower portion of tank 10 is line 42 which is connected to and forms an extension of line 24. Lines 24 and 42 are connected by a coupling or the like 46. Line 42 is connected with a larger circular or cylindrical drum 48 which forms part of the blowback pot 28 and which is shown more particularly in Fig. 2. The other end of the drum 48 communicates with the smaller line 32 leading to one side of the pressure responsive indicator 26 as above described. It will be seen that the diameter of the drum 48 is much larger than the diameter of the inlet and outlet lines 42 and 32. The drum 48 has enclosing ends 49 and 50 from which the lines 42 and 32 extend. Enclosing ends 49 and 50 are in the shape of washers or flat discs with central openings to receive the ends of lines or pipes 42 and 32. Lines or pipes 22, 24, 42 and 32 are preferably of the same internal diameter.

Surrounding the major portion of the cylindrical drum 48 and concentric therewith is another larger drum or jacket 52 provided with a steam inlet line 54. The jacket is circular in cross section and has a larger diameter than the cylindrical drum 48 but as shown is shorter in length than drum 48. The jacket 52 has end walls or enclosing ends 55 which are in the form of discs with central openings or washers to fit on the outer surface on the cylindrical drum 48. The central openings are of substantially the same diameter as external diameter of drum 48 to fit thereon. The jacket 52 and drum 48 are secured in air-tight connection in any suitable manner as by welding or soldering.

Steam is introduced through line 54 at the upper portion of jacket 52 and condensate water is withdrawn from the bottom part of the jacket through line 56 into drip pot or condensate pot 58. The purpose of the condensate pot is to conserve steam and it is standard equipment where steam is used for heating purposes. When the steam being used gives up most of its heat, it begins to condense back into water When the water collects enough to fill the condensate pot, the pot flushes the water out leaving a new batch of steam in the drum. Condensate water is withdrawn from the condensate pot through line 62 and discarded. A bleeder line 64 extended through the wall of jacket 52 and the wall of drum 48 and into the drum 48 is provided with a valve 66 for bleeding off accumulated liquid or the like from the jacket 48. Bleeder line 64 bleeds off material from jacket 48. This bleeder line is necessary because oil particles from the cylinder walls of the compressors eventually build up and condense in any static (or still) place. As necessary and at least once every few months the valve 66 in line 64 should be opened to let this oil out of the pot 48.

The pressure responsive indicator 26 may be any conventional measuring instrument such as a Foxboro meter, or any pressure sensing meter such as a Brown, Taylor, American, Barton, etc.

In a specific apparatus the tank 10 has a diameter of about 5 feet and a height of about 7 feet. The lines 24 and 42 leading from the bottom portion of the tank 10 and lines 22 and 32 are made of ½" stainless steel pipe. The end of the pipe 42 is screwed into the opening in the end wall 49 of the cylindrical drum 48 which is made of a 2" stainless steel pipe. The steam jacket 52 is about 3" in diameter and about 10" long. The cylindrical drum 48 is about 14" long. The steam inlet line 54, the bleeder line 64 and the bottom condensate water withdrawal line 56 are about ½" in diameter.

The operation of the invention will now be described in connection with a tank containing liquefied ethylene maintained at a temperature between about −110° F. and −150° F. and a pressure of about 3 p.s.i.g. The valve 25 in line 24 is opened to be wide open to permit continuous passage of only a small amount of liquefied ethylene through line 42 into the cylindrical drum 48. The liquefied ethylene is introduced into the cylindrical drum 48 at a very slow rate, about one drop of ethylene per second. Low pressure steam at a temperature of about 300° F. is continuously introduced into the steam jacket 52 through line 54 at the rate of about one lb. per hour. The liquefield ethylene is continuously introduced into the cylinder drum 48 and low pressure steam is continuously introduced into the steam jacket 52 to maintain the steam jacket at a temperature of about 250° F.

The heat of the steam in the steam jacket heats up cylindrical drum 48 and this causes the liquefied ethylene to flash instantly into a gas and this creates a pressure in the cylindrical drum 48. The instant that one drop of ethylene hits the heated pot 48, it flashes violently into vapor, tends to build up pressure, and goes back into the drum or vessel 10 where it came from, since that is the lower pressure regardless of the pressure of the drum 10 that it goes back into. Its built up pressure cannot go anywhere else. With valve 38 in line 35 closed and valve 34 in line 32 open the pressure created by the vaporized liquefied ethylene in cylindrical drum 48 will be transmitted to one side of the pressure responsive indicator 26. The pressure within the inner cylindrical drum 48 also forces the flashed gas back into the tank or vessel 10 through lines 42 and 24 since there is no other place for the gas to go. Sufficient pressure is built up to balance the head of liquid extending from line 24 to the level 14 of the liquefied ethylene in tank 10. The steam keeps the drum 48 hot and thereby a continuous blow-back process is established to keep lines 24, 42 and 32 dry, and accurate measurement is assured.

The top line 22 with the valve 36 open communicates with the upper portion of the tank 10 above the liquefied ethylene under low pressure and the pressure existing in the top of the tank 10 is transmitted to the other side of the pressure responsive indicator 26. As the ethylene exists as a gas in the upper part of the tank 10 it is not necessary for a blowback to be supplied for the top line 22 as the ethylene remains as a gas and will not liquefy in line 22. The difference in pressure between the top line 22 and the pressure within the cylindrical drum 48 corresponds to the head of liquid in the tank 10 and this reading is taken on the calibrated pressure responsive indicator 26.

The rate of introduction of the liquefied ethylene from the tank 10 to the internal cylindrical drum 48 may vary between about 1 and 2 lbs. per hour. The temperature of the steam introduced through line 54 into the steam jacket 52 may be between about 250° and 320° F. The temperature of the internal cylindrical drum 48 may be between about 220° and 270° F.

While the specific example has been given for ethylene maintained under a relatively low pressure in tank 10 it is to be understood that the invention may be used with tanks containing liquefied ethylene under higher pressures. Also the invention may be used with other liquefied hydrocarbon gases or other liquefied gases such as carbon dioxide, sulfur dioxide, etc. The invention may be used in blowback systems generally where liquefied normally gaseous materials are to be measured in tanks or vessels.

While a specific size of one form of self blowback pot has been disclosed, it is to be understood that the invention is not to be restricted to these dimensions as the size of the pot may be varied without departing from the spirit of the invention.

It is desirable to insulate the tank 10 and blowback pot 28 and the lines connecting the blowback pot to the tank 10 and to the pressure responsive indicator 26.

What is claimed is:

A level indicating system for liquids in tanks including a vertically arranged cylindrical tank adapted to contain cold liquefied normally gaseous material, a pressure responsive indicator, one line leading directly from the top portion of said tank above the level of liquid therein to one side of said indicator, a second line leading directly from the bottom portion of said tank below the level of liquid therein to the other side of said indicator and being provided with a valve for controlling flow of liquid from said tank into said second line, said second line communicating with said other side of said indicator, a vaporizer pot in said second line between said valve and said other side of said indicator and including a steam jacket whereby a small amount of liquid continuously withdrawn from said tank is flash vaporized in said second line to create a pressure equal to the head of liquid in said tank which pressure is also transmitted to said other side of said indicator while maintaining said second line substantially completely dry, said vaporizer pot including an enlarged cylindrical drum section forming an intermediate portion of said second line, said steam jacket comprising an enlarged cylindrical jacket concentric with and surrounding said enlarged cylindrical drum section and of shorter length than said drum section, said jacket being provided with a steam inlet line and a condensate water outlet line.

References Cited in the file of this patent

UNITED STATES PATENTS

| | | |
|---|---|---|
| 1,904,785 | Gay | Apr. 18, 1933 |
| 2,326,511 | Zenner | Aug. 10, 1943 |
| 2,337,171 | Winton | Dec. 21, 1943 |
| 2,542,168 | Voleau | Feb. 20, 1951 |
| 2,700,900 | Etienne | Feb. 1, 1955 |